US012299637B2

(12) United States Patent
Nookala et al.

(10) Patent No.: US 12,299,637 B2
(45) Date of Patent: May 13, 2025

(54) CROSS DATA CENTER DATA FEDERATION FOR ASSET COLLABORATION

(71) Applicant: SAP SE, Walldorf (DE)

(72) Inventors: Ranjith Kumar Nookala, Bengaluru (IN); Srikanth Grandhe, Bengaluru (IN); K. Satya Prasad, Bengaluru (IN); Simone Turrin, Heidelberg (DE)

(73) Assignee: SAP SE, Walldorf (DE)

( * ) Notice: Subject to any disclaimer, the term of this patent is extended or adjusted under 35 U.S.C. 154(b) by 291 days.

(21) Appl. No.: 17/935,305

(22) Filed: Sep. 26, 2022

(65) Prior Publication Data

US 2024/0104501 A1    Mar. 28, 2024

(51) Int. Cl.
*G06Q 30/00* (2023.01)
*G06Q 10/10* (2023.01)

(52) U.S. Cl.
CPC ................ *G06Q 10/103* (2013.01)

(58) Field of Classification Search
CPC .................................. G06Q 10/103
See application file for complete search history.

(56) References Cited

U.S. PATENT DOCUMENTS

| 2009/0111425 | A1* | 4/2009 | Forbes | G06Q 10/10 455/418 |
| 2010/0031271 | A1* | 2/2010 | Corry | G06F 9/544 719/312 |
| 2010/0153343 | A1* | 6/2010 | Guldner | G06Q 10/06315 707/689 |
| 2017/0193454 | A1* | 7/2017 | Rotolo | G06Q 10/1053 |
| 2017/0286519 | A1* | 10/2017 | Bazarsky | G06F 16/2358 |
| 2018/0137015 | A1* | 5/2018 | Boshev | G06F 16/27 |
| 2019/0220529 | A1* | 7/2019 | Eberlein | G06F 16/211 |
| 2019/0311137 | A1* | 10/2019 | Mallya | G06N 20/00 |
| 2020/0044851 | A1* | 2/2020 | Everson | G06Q 20/3821 |
| 2020/0099709 | A1* | 3/2020 | Vasseur | H04L 45/22 |
| 2021/0019705 | A1* | 1/2021 | Yu | G06Q 10/103 |

(Continued)

OTHER PUBLICATIONS

Using groupware technology to construct a learning organization: A case study of a groupware-based enriched learning and information environment Wang, Fengkwei. ProQuest Dissertations and ThesesProQuest Dissertations & Theses. (1997) (Year: 1997).*

(Continued)

*Primary Examiner* — Matthew T Sittner
(74) *Attorney, Agent, or Firm* — Mintz Levin Cohn Ferris Glovsky and Popeo, P.C.

(57) ABSTRACT

A method may include a collaboration controller receiving a collaboration request to share a data asset associated with a first customer onboarded at a first data center with a second customer. In response to the collaboration request, the collaboration controller may determine that the second customer is onboarded at a second data center but not the first customer. Moreover, the collaboration controller may replicate, at the second data center, the data asset associated with the first customer upon determining that a copy of the data asset is not already present at the second data center. The replicating of the data asset may provide the second customer access to the data asset by at least creating, at the second data center, the copy of the data asset. Related systems and computer program products are also provided.

17 Claims, 7 Drawing Sheets

(56) References Cited

U.S. PATENT DOCUMENTS

| | | | |
|---|---|---|---|
| 2021/0056119 A1* | 2/2021 | Majmudar | G06F 16/27 |
| 2021/0318998 A1* | 10/2021 | Filip | G06F 16/245 |
| 2022/0148348 A1 | 5/2022 | Jordan et al. | |
| 2022/0414601 A1* | 12/2022 | Shek | G06Q 10/103 |
| 2023/0004401 A1 | 1/2023 | Owen et al. | |
| 2024/0054822 A1* | 2/2024 | Alfonsetti | G07C 5/008 |

OTHER PUBLICATIONS

User tailored cloud-learning system using SNS and learning resources Jeong, Hwa-young; Hong, Bong Hwa; Park, Jong Hyuk. Multimedia Tools and Applications 74.14: 5073-5084. Dordrecht: Springer Nature B.V. (Jul. 2015) (Year: 2015).*

Asynchronous Replication of Metadata Across Multi-Master Servers in Distributed Data Storage Systems Akturk, Ismail. ProQuest Dissertations and ThesesProQuest Dissertations & Theses. (2009) (Year: 2009).*

ADIC CentraVision Brings Failover to SANs; High Data Availability to Help Move Technology to Enterprise, Web Applications Business Editors. Business Wire: 1. New York: Business Wire. (Jun. 1, 2000) (Year: 2000).*

Teaming with potential: Novell GroupWise 5.0 Cox, Nancy. Network Computing 7.n18: p118(9). United Business Media LLC. (Nov. 15, 1996) (Year: 1996).*

U.S. Appl. No. 17/541,739, filed Dec. 3, 2021, Pal et al.

\* cited by examiner

CROSS DATA CENTER DATA FEDERATION FOR ASSET COLLABORATION

TECHNICAL FIELD

The subject matter described herein relates generally to cloud computing and more specifically to cross data center data federation.

BACKGROUND

An enterprise may rely on a suite of enterprise software applications for sourcing, procurement, supply chain management, invoicing, and payment. These enterprise software applications may provide a variety of data processing functionalities including, for example, billing, invoicing, procurement, payroll, time and attendance management, recruiting and onboarding, learning and development, performance and compensation, workforce planning, and/or the like. Examples of enterprise software applications may include enterprise resource planning (ERP) software, customer relationship management (CRM) software, and/or the like. Data associated with multiple enterprise software applications may be stored in a common database in order to enable integration across different enterprise software applications. Moreover, to provide access to multiple end users from different geographic locations, many enterprise software applications may be deployed as a web-based application (e.g., a software-as-a-service (SaaS)) such that the functionalities of the enterprise software applications are available for remote access.

SUMMARY

Systems, methods, and articles of manufacture, including computer program products, are provided for cross data center data federation. In some example embodiments, there is provided a system that includes at least one processor and at least one memory. The at least one memory may include program code that provides operations when executed by the at least one processor. The operations may include: receiving a first collaboration request to share a data asset associated with a first customer onboarded at a first data center with a second customer; in response to the first collaboration request, determining that the second customer is onboarded at one or more different data centers than the first customer, the one or more different data centers including a second data center; determining whether a copy of the data asset is present at the second data center; and replicating, at the second data center, the data asset associated with the first customer upon determining that the copy of the data asset is not already present at the second data center, the replicating of the data asset providing the second customer access to the data asset by at least creating, at the second data center, the copy of the data asset.

In another aspect, there is provided a method for cross data center data federation. The method may include: receiving a first collaboration request to share a data asset associated with a first customer onboarded at a first data center with a second customer; in response to the first collaboration request, determining that the second customer is onboarded at one or more different data centers than the first customer, the one or more different data centers including a second data center; determining whether a copy of the data asset is present at the second data center; and replicating, at the second data center, the data asset associated with the first customer upon determining that the copy of the data asset is not already present at the second data center, the replicating of the data asset providing the second customer access to the data asset by at least creating, at the second data center, the copy of the data asset.

In another aspect, there is provided a computer program product including a non-transitory computer readable medium storing instructions. The instructions may cause operations may executed by at least one data processor. The operations may include: receiving a first collaboration request to share a data asset associated with a first customer onboarded at a first data center with a second customer; in response to the first collaboration request, determining that the second customer is onboarded at one or more different data centers than the first customer, the one or more different data centers including a second data center; determining whether a copy of the data asset is present at the second data center; and replicating, at the second data center, the data asset associated with the first customer upon determining that the copy of the data asset is not already present at the second data center, the replicating of the data asset providing the second customer access to the data asset by at least creating, at the second data center, the copy of the data asset.

In some variations of the methods, systems, and non-transitory computer readable media, one or more of the following features can optionally be included in any feasible combination.

In some variations, in response to determining that the copy of the data asset is already present at the second data center, the replicating of the data asset at the second data center may be bypassed.

In some variations, the second customer may be determined to be onboarded at a third data center but the first customer is not onboarded at the third data center. Whether the copy of the data asset is present at a third data center may be determined. The data asset associated with the first customer may be replicated at the third data center upon determining that the copy of the data asset is not already present at the third data center.

In some variations, the data asset may include a profile of the first customer.

In some variations, the replicating of the profile of the first customer at the second data center may render the first customer visible to the second customer onboarded at the second data center.

In some variations, the data asset may include one or more documents associated with an enterprise software application.

In some variations, the copy of the data asset may be deleted from the second data center upon an end of a validity period and/or an expiration of an expiration date specified by the first customer.

In some variations, the copy of the data asset may be deleted from the second data center in response to an offboarding of the first customer and/or the second customer.

In some variations, the copy of the data asset may be deleted from the second data center in response to a request from the first customer to unshare the data asset.

In some variations, a modification of the data asset may be detected at the first data center. In response to detecting the modification of the data asset at the first data center, the modification may be propagated to the second data center by at least applying a same change to the copy of the data asset at the second data center.

In some variations, a second collaboration request may be received from the second customer to access the data asset associated with the first customer. The data asset associated with the first customer may be replicated at the second data center upon receiving, from the first customer, an approval of the request to access the data asset.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Enterprise software applications may provide a variety of solutions for sourcing, procurement, supply chain management, invoicing, and payment. To optimize performance, manage cost, and leverage the best qualities of individual cloud providers, many modern enterprise software applications are deployed as multi-cloud solutions across multiple platform-as-a-service (Paas) and/or infrastructure-as-a-service (IaaS) offerings. Multi-cloud solutions may afford customers the flexibility to be onboarded on a region and data center of their choice. However, a first customer onboarded on a first data center may be prevented from collaborating with a second customer onboarded on a second data center because customer details and application data for the first customer and the second customer are not available across multiple data centers. Multidirectional data copy across multiple data centers is costly yet provides inadequate performance.

In some example embodiments, a federation service may be configured to replicate data across multiple data centers on an on-demand basis in order to enable collaboration across data centers. In one example scenario, the federation service may respond to a collaboration request from a first customer onboarded at a first data center to share a data asset (e.g., a data object such as a profile of the first customer) with a second customer by at least determining whether the second customer is onboarded at same data center or a different data center than the first customer. In the event the second customer is onboarded at a second data center, the federation service may determine whether the same data asset is already present at the second data center. If the data asset is not present at the second data center, the federation service may replicate, at the second data center, the data asset. Alternatively and/or additionally, the federation service may receive, from the second customer onboarded at the second data center, a collaboration request to access a data asset associated with the first customer. In response determining that the first customer is onboarded at the first data center and the data asset associated with the first customer is not already present at the second data center, the federation service may replicate the data asset at the first data center upon receiving, from the first customer, an approval of the request to access the data asset.

Figure 1:
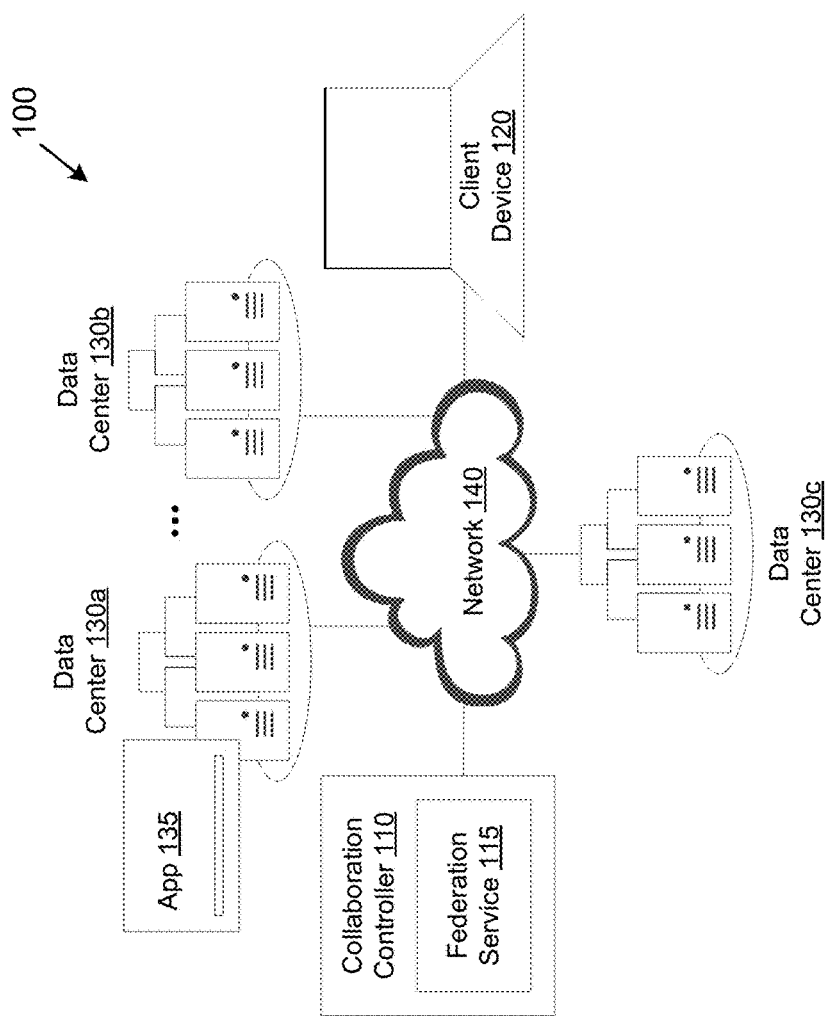
FIG. 1 depicts a system diagram illustrating an example of a cloud computing system, in accordance with some example embodiments.

FIG. 1 depicts a system diagram illustrating an example of a cloud computing system 100, in accordance with some example embodiments. Referring to FIG. 1, the cloud computing system 100 may include a collaboration controller 110, a client device 120, and one or more data centers 130. As shown in FIG. 1, the collaboration controller 110, the client device 120, and the one or more data centers 130 may be communicatively coupled via a network 140. The client device 120 may be a processor-based device including, for example, a smartphone, a tablet computer, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

The one or more data centers 130 may include a collection of computational resources including, for example, computer systems, telecommunication systems, storage systems, and/or the like. Moreover, the one or more data centers 130 may be maintained by a same cloud provider or different cloud providers. To optimize performance, manage cost, and leverage the best qualities of individual cloud providers, a software application 135 may be deployed as a multi-cloud solution across multiple platform-as-a-service (Paas) and/or infrastructure-as-a-service (IaaS) offerings. For example, the software application 135 may be a web-based application and/or a cloud-based application hosted at a first data center 130a and a second data center 130b such that the software application 135 is accessible at the client device 120 through the network 140. The software application 135 may be an enterprise software applications including, for example, an enterprise resource planning (ERP) application, a customer relationship management (CRM) application, a process management application, a process intelligence application, a sales engagement application, a territory and quota management application, an agent performance management (APM) application, a social networking application, a data warehousing application, a logistic collaboration application, and/or the like.

In some example embodiments, the collaboration controller 110 may provide a federation service 115 configured to replicate data across the one or more data centers 130 on an on-demand basis. For example, the federation service 115 may respond to the creation, update, and/or deletion of a data asset (e.g., a data object such as a customer profile) associated with a first customer onboarded at the first data center 130a by replicating the data asset at the second data center 130b. Moreover, in some cases, the federation service 115 may replicate the data asset in response to receiving a collaboration request to share the data asset or access the data asset. For instance, the federation service 115 may replicate, at the second data center 130b, the data asset in response a collaboration request from the first customer onboarded at the first data center 130a to share the data asset with a second customer onboarded at the second data center 130b. Alternatively and/or additionally, the federation service 115 may replicate the data asset at the second data center 130b in response to the first customer onboarded at the first data center approving a collaboration request to access the data asset from the second customer onboarded at the second data center 130b. In this context, replicating the data asset at the second data center 130b may include creating a copy of the data asset at the second data center 130b.

In some example embodiments, upon receiving, from the first customer onboarded at the first data center 130a, a collaboration request to share the data asset with the second customer, the federation service 115 may first determine whether the second customer is onboarded at a same data center or a different data center than the first customer. The federation service 115 may replicate the data asset at the second data center 130b upon determining that the second customer is onboarded a different data center and that a copy of the data asset is not already present at the second data center 130b. Contrastingly, the federation service 115 may omit replicating the data asset at the second data center 130b. In cases where the second customer is also onboarded at a third data center 130c, the federation service 115 may determine whether a copy of the data asset is already present at the third data center 130c.

In some example embodiments, upon receiving, from the second customer onboarded at the second data center 130b, a collaboration request to access the data asset associated with the first customer, the federation service 115 may first determine whether the first customer is onboarded at a same data center or a different data center than the second customer. If the first customer is onboarded at a different data center and a copy of the data asset is not already present at the second data center 130b, the federation service 115 may replicate the data asset at the second data center 130b upon receiving, from the first customer, an approval of the request to access the data asset. In cases where a copy of the data asset is already present at the second data center 130b, the federation service 115 may omit replicating the data asset at the second data center 130b and continue onto the third data center 130c if the second customer is also onboarded at the third data center 130c.

In some example embodiments, the replication and persistence of the data asset at the second data center 130b may be subject to one or more conditions specified by the first customer associated with the data asset. For example, the first customer may specify a validity period and/or an expiration date for the copy of the data asset created at the second data center 130b, in which case the federation service 115 may prevent the copy of the data asset from being persisted at the second data center 130b beyond validity period and/or the expiration date by at least deleting the copy of the data asset created at the second data center 130b. Alternatively and/or additionally, the federation service 115 may delete the copy of the data asset created at the second data center 130b in response to a request from the first customer to unshare the data asset with the second customer onboarded at the second data center 130b or upon an offboarding of the first customer from the first data center 130a and/or the second customer from the second data center 130b. In some instances, the replicating of the data asset may also be subject to one or more non-customer specific restrictions. For instance, the federation service 115 may replicate the data asset at the second data center 130b but not the third data center 130c if the data asset lacks the legal clearance and/or security permission for replication at the third data center 130c.

Figure 2:
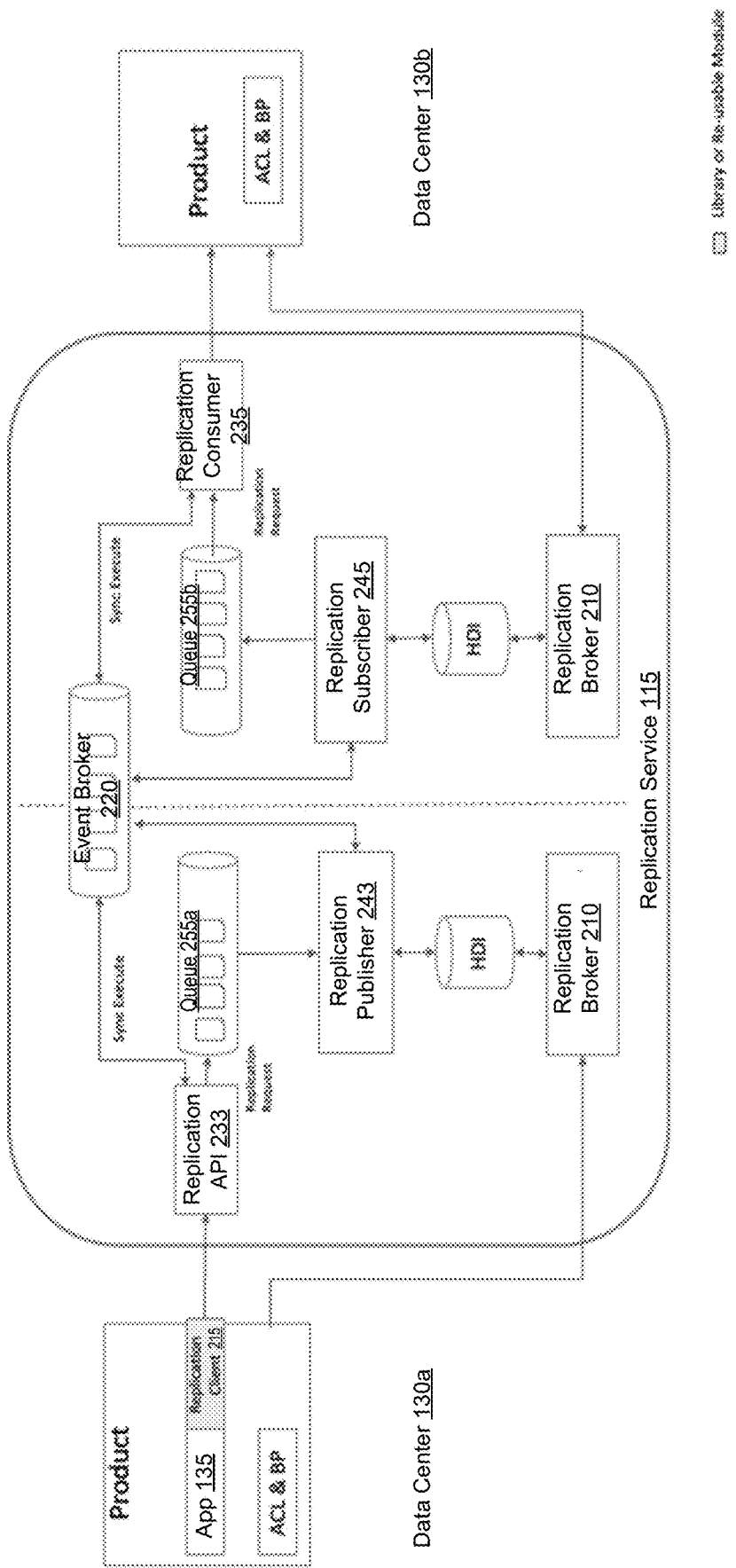
FIG. 2 depicts a schematic diagram illustrating an example of a data federation architecture, in accordance with some example embodiments.

FIG. 2 depicts a schematic diagram illustrating an example of a data federation architecture, in accordance with some example embodiments. In the example shown in FIG. 2, the replication service 115 may be configured to replicate data from the first data center 130a to the second data center 130b. For example, as shown in FIG. 2, a replication client 215 associated with the software application 135 deployed at the first data center 130a may be configured to detect one or more events triggering the replication of data from the first data center 130a to the second data center 130b. In some example embodiments, the replication client 215 may provide a library and/or a reusable module for the software application 135 to interact with the replication service 115. For example, in some instances, the software application 135 may trigger data replication (e.g., from the first data center 130a to the second data center 130b) by invoking a replication method associated with the replication client 215 instead of making direct calls to a replication application programming interface (API) 233 of the replication service 115. As shown in FIG. 2, upon detecting the one or more trigger events, the replication client 215 may respond to the invocation of the replication method by calling the replication application programming interface (API) 233 of the replication service 115.

Referring again to FIG. 2, in response to the replication client 215 calling the replication application programming interface (API) 233 of the replication service 115, a corresponding replication request may be inserted into a first queue 255a. A replication publisher 243 may subsequently publish the replication request to an event broker 220. As shown in FIG. 2, the event broker 220 may insert the replication request to a second queue 255*b* of a replication subscriber 245, which may further forward the replication request to a replication consumer 235 associated with the second data center 130*b*. The replication consumer 235 may replicate the data from the first data center 130*a* at the second data center 130*b*. A replication broker 210 may coordinate the data replication, for example, through interaction with the replication publisher 243 and the replication subscriber 245. For example, the replication broker 210 may publish a catalog of services and service plans, manage the provisioning and de-provisioning of service instances, and provide connection details and credentials for an application (e.g., the software application 135) to consume e resource.

Multi-cloud solutions in which the software application 130 may be deployed at multiple data centers, such as the first data center 130*a*, the second data center 130*b*, and the third data center 130*c*, may afford customers the flexibility to be onboarded on a region and data center of their choice. However, a first customer onboarded on the first data center 130*a* may be prevented from collaborating with a second customer onboarded on the second data center 130*b* because customer details and application data for the first customer and the second customer are not available across multiple data centers. Multidirectional data copy across multiple data centers may be costly yet provides inadequate performance. As such, in some example embodiments, to enable collaboration between the first customer onboarded at the first data center 130*a* and the second customer onboarded at the second data center 130*b*, the replication service 115 is configured to replicate data from the first data center 130*a* to the second data center 130*b* on an on-demand basis. For example, the replication of data from the first data center 130*a* to the second data center 130*b* may be triggered by one or more events. Moreover, the replication of data from the first data center 130*a* to the second data center 130*b* may be subject to one or more data replication relevant settings including, for example, legal clearances, security permissions, and/or the like.

Figure 3A:
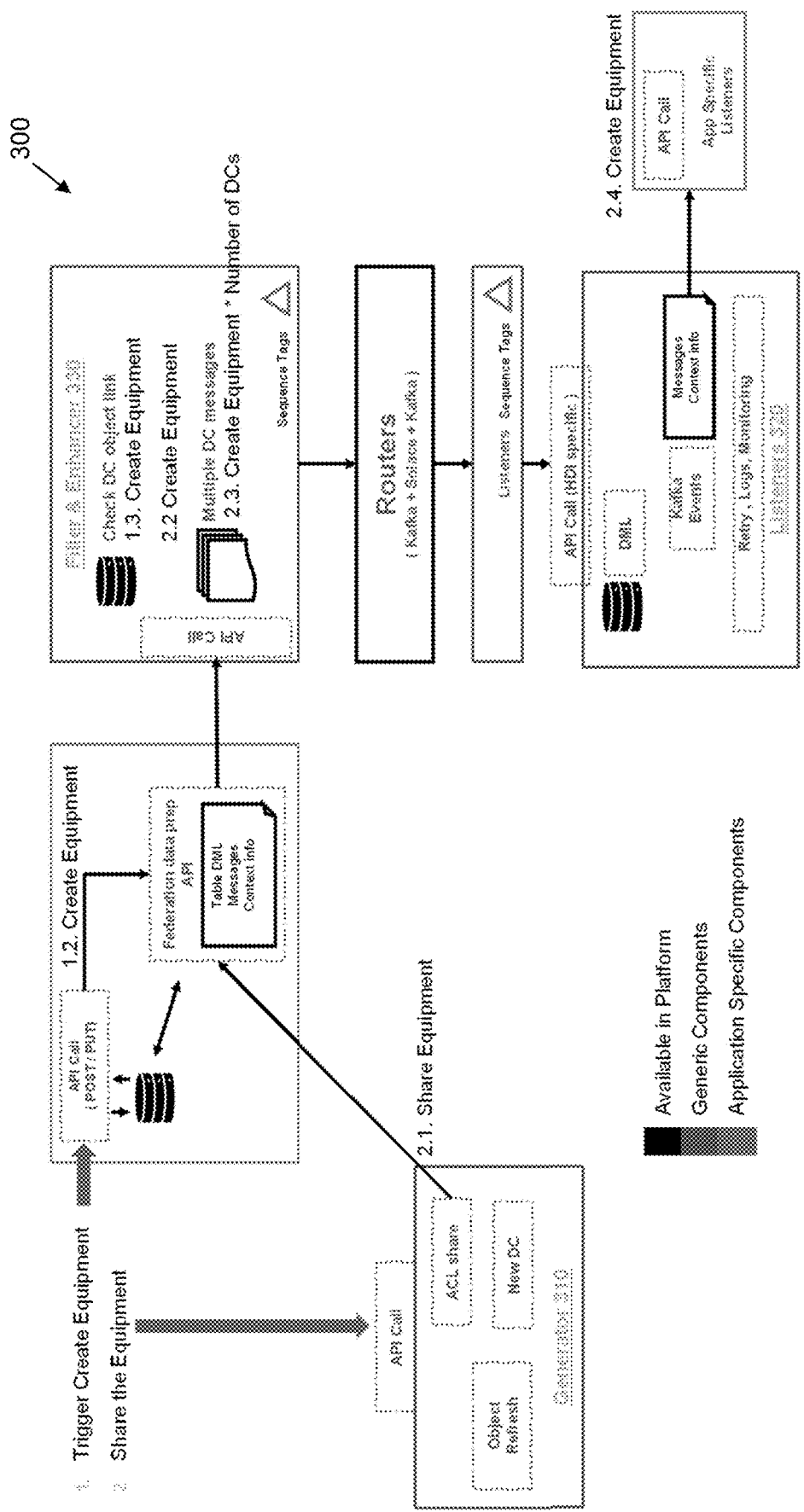
FIG. 3A depicts a schematic diagram illustrating an example of a cross data center data federation workflow, in accordance with some example embodiments.
Figure 3B:
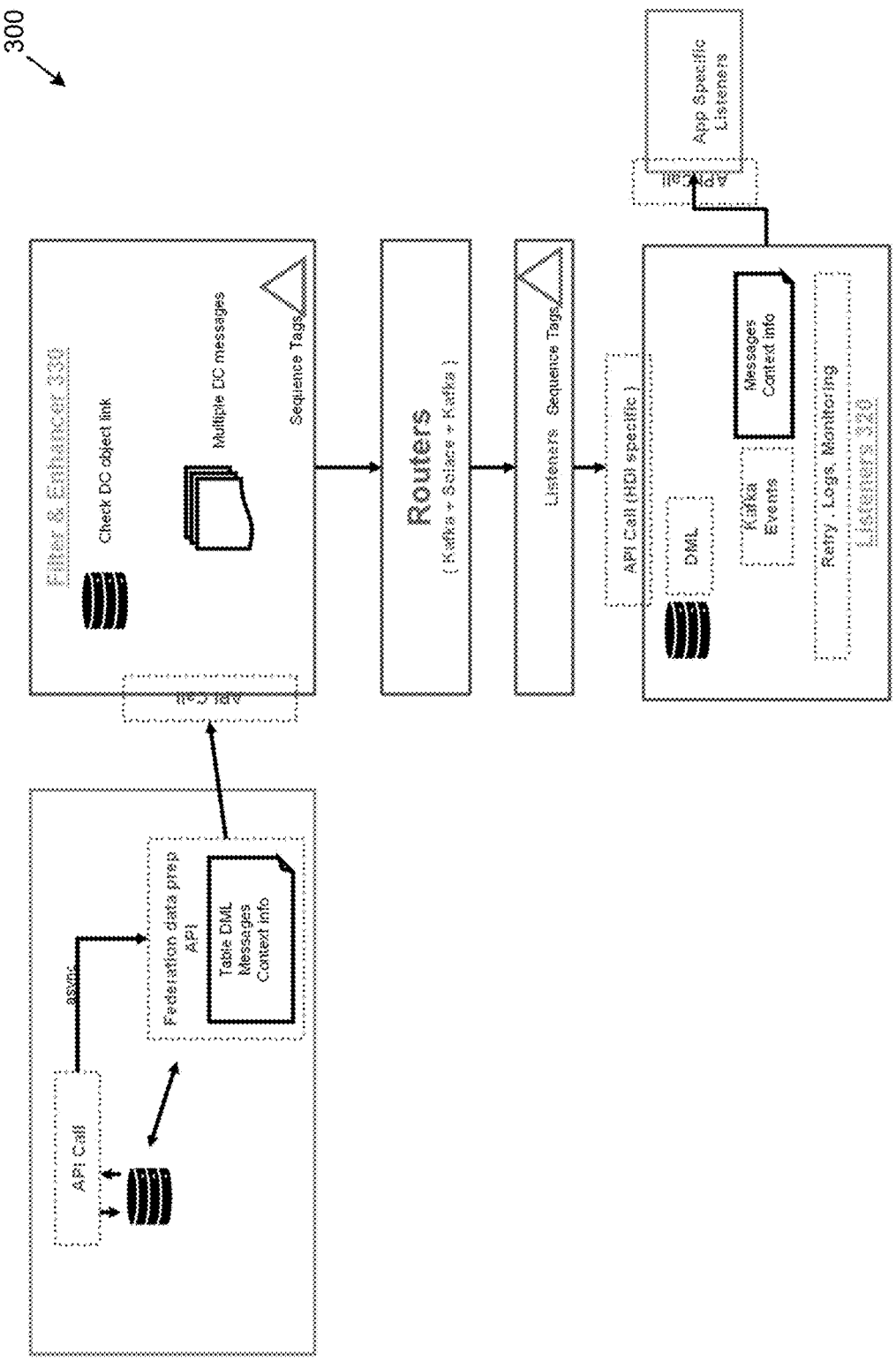
FIG. 3B depicts a schematic diagram illustrating another example of a cross data center data federation workflow, in accordance with some example embodiments.
Figure 3C:
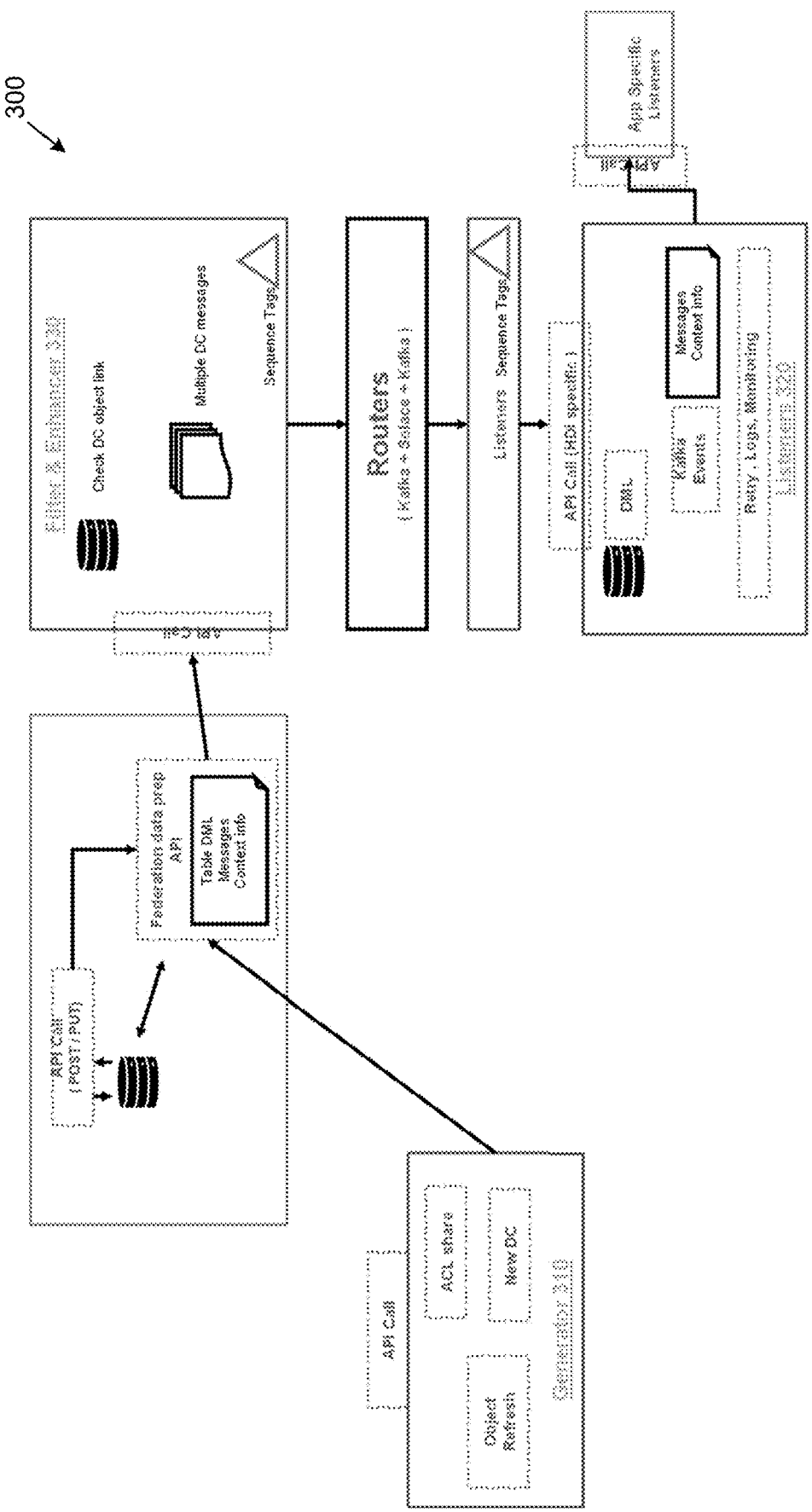
FIG. 3C depicts a schematic diagram illustrating another example of a cross data center data federation workflow, in accordance with some example embodiments.

FIGS. 3A-C depicts schematic diagrams illustrating different examples of a cross data center data federation workflow 300, in accordance with some example embodiments. Referring to FIGS. 3A-C, the collaboration controller 110 may include a generator 310, one or more listeners 320, and one or more filters and enhancers 330 in order to implement the federation service 115. In the examples of the cross data center data federation workflow 300 shown in FIGS. 3A-B, the generator 310 may be configured to respond to collaboration requests to share a data asset (e.g., a data object such as a customer profile), for example, by fetching a list of data assets that require replication, identify an execution hierarchy (e.g., attribute first and/or the like), determine whether a data asset is already present at a destination data center, and call an object specific create scenario in order to replicate data assets not already present at the destination data center.

In the examples of the cross data center data federation workflow 300 shown in FIGS. 3A-B, the generator 310 may also be configured to respond to the addition of a new data center. For example, a new data center may be added when the second customer onboarded at the second data center 130*b* is subsequently onboarded at the third data center 130*c* after the data asset associated with the first customer is replicated at the second data center 130*b*. Accordingly, as shown in FIGS. 3A-C, the generator 310 may respond to the addition of a new data center by fetching a list of data assets that require replication, identify the execution hierarchy (e.g., attribute first and/or the like), and call an object specific create scenario in order to replicate data assets at the new destination data center.

In some example embodiments, FIGS. 3A-C show that the generator 310 may also be configured to refresh copies of data assets created at various data centers. For example, the generator 310 may refresh the copy of the data asset created at the second data center 130*b* in response to subsequent modifications made to the data asset. As shown in FIGS. 3A-C, the generator 310 may refresh a data asset by fetching a list of data assets that require updating, identify the execution hierarchy (e.g., attribute first and/or the like), and call an object specific update scenario in order to update the data assets. Doing so may synchronize, for example, the data asset present at the first data center 130*a* with the copy of the data asset created at the second data center 130*b*, thus ensuring the integrity of the copy of the data asset accessible to the second customer onboarded at the second data center 130*b*.

In some example embodiments, the generator 310 may be further configured to respond to the offboarding of a customer, for example, by deleting one or more corresponding data assets. For example, in the event the first customer is off boarded from the first data center 130*a*, the generator 310 may remove the data assets associated with the first customer from the first data center 130*a* as well as copies of the data assets created at other data centers, such as the second data center 130*b* and/or the third data center 130*c*, in response to earlier requests from the first customer to share the data assets with customers onboarded at these data centers. Alternatively and/or additionally, if the second customer is off boarded from the second data center 130*b*, the generator 310 may remove, from the second data center 130*b*, the data assets associated with the second customer as well as the copies of the data assets belonging to other customers that were created at the second data center 130*b* in response to earlier requests to share and/or access these data assets.

Referring again to FIGS. 3A-C, the one or more listeners 320 may interface with an event streaming service (e.g., Kafka and/or the like) in order to receive messages and execute insert and/or upsert operations, procedure execution statements, and/or the like. The one or more listeners 320 may also handle execution at deployment infrastructure container specific level based on object type and/or object configuration. As shown in FIGS. 3A-C, the one or more listeners 320 may raise event stream events, attempt retries, and update a corresponding log when a retry is unsuccessful. In some cases, the one or more listeners 320 may monitor integration, decode messages, and impose certain security restriction including, for example, no delete statement except for association tables. Furthermore, in some cases, the one or more listeners 320 may support parallel execution per table and sequence within a table.

Referring again to FIGS. 3A-C, the one or more filters and enhancers 330 may include a repository that stores information about which data assets (e.g., data objects such as customer profiles) have already been replicated and at which data center. Accordingly, before the generator 310 replicates the data asset associated with the first customer at the second data center 130*b* in order to provide the second customer onboarded at the second data center 130*b* access to the data asset, the generator 310 may first apply the one or more filters and enhancers 330 to determine whether that particular data asset has already been replicated at the second data center 310*b*. If the data asset associated with the first customer has already been replicated at the second data center 130*b*, the generator 310 may bypass the second data center 130*b* and continue onto the third data center 130*c* if the second customer is also onboarded at the third data center 130*c*. In the event the data asset associated with the first customer is updated, the generator 310 may apply the one or more filters and enhancers 330 to determine that a copy of the data asset is present, for example, at the second data center 130*b* and the third data center 130*c*, and send a corresponding update message to those data centers.

Figure 4:
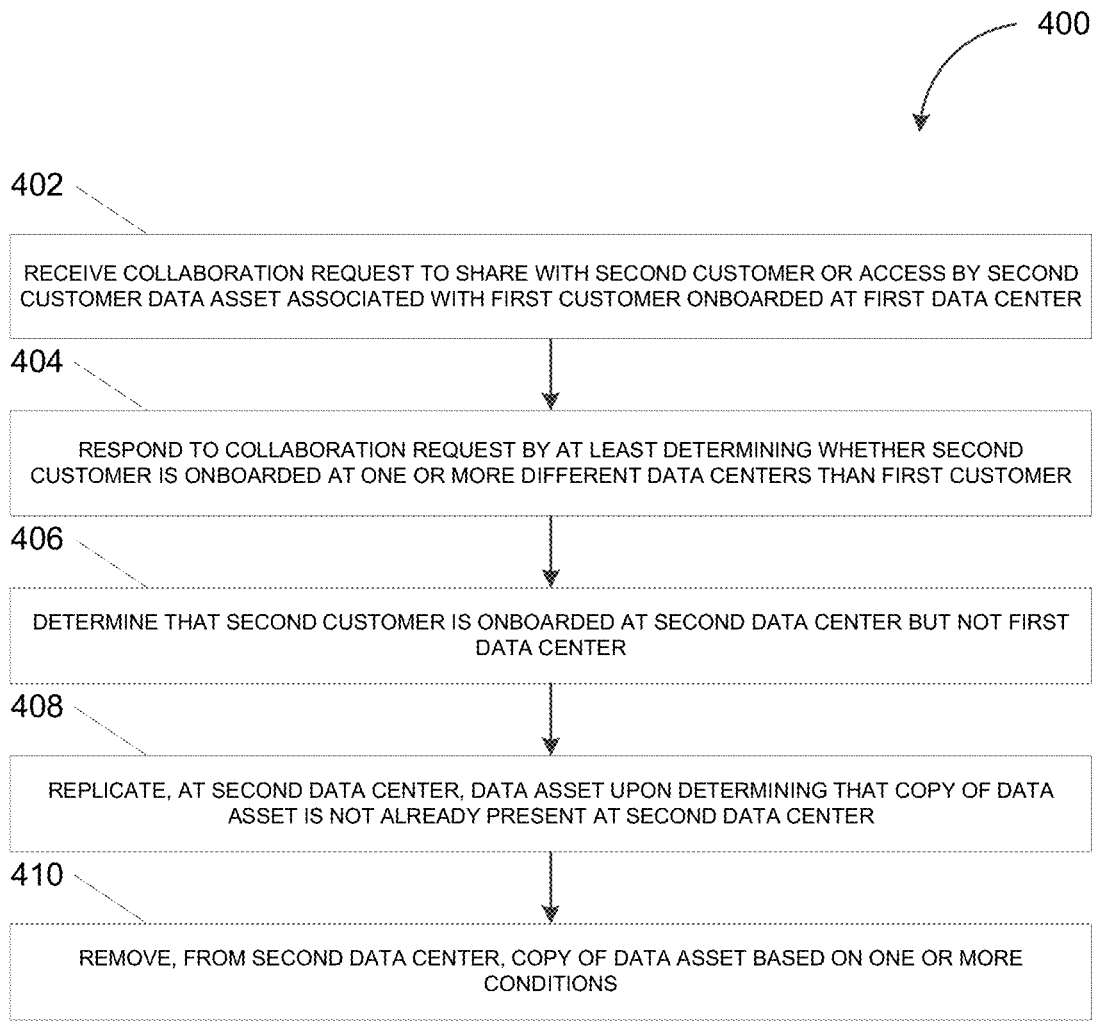
FIG. 4 depicts a flowchart illustrating an example of a process for cross data center data federation, in accordance with some example embodiments.

FIG. 4 depicts a flowchart illustrating an example of a process 400 for cross data center data federation, in accordance with some example embodiments. Referring to FIGS. 1-4, the process 400 may be performed by the collaboration controller 110, for example, the federation service 115, to replicate data from the first data center 130*a* to the second data center 130*b*.

At 402, the collaboration controller 110 may receive a collaboration request to share with a second customer or access by a second customer a data asset associated with a first customer onboarded at a first data center. In some example embodiments, the collaboration controller 110 (e.g., the federation service 115) may receive, from the first customer onboarded at the first data center 130*a*, a collaboration request to share a data asset associated with the first customer (e.g., a data object such as a profile of the first customer) with a second customer. Alternatively and/or additionally, the collaboration controller 110 (e.g., the federation service 115) may receive, from the second customer, a collaboration request to access the data asset associated with the first customer onboarded at the first data center. In some cases, the data asset associated with the first customer may be a customer profile of the first customer, one or more documents associated with the software application 135, and/or the like. In instances where the data asset is a data object corresponding to a profile of the first customer onboarded at the first data center, replicating the data asset at a different data center at which the first customer is not onboarded, such as the second data center 130*b*, may render the first customer visible at that data center and available for collaboration with the customers onboarded thereon. The opportunity for customers onboarded at different data centers to collaborate across data centers would not exist without the collaboration controller 110 replicating the necessary data assets.

At 404, the collaboration controller 110 may respond to the collaboration request by at least determining whether the second customer is onboarded at one or more different data centers than the first customer. For example, in some example embodiments, the collaboration controller 110 (e.g., the federation service 115) may replicate the data asset associated with the first customer if the first customer and the second customer are onboarded at different data centers. In instances where the second customer is onboarded at one or more data centers where the first customer is not onboarded, the collaboration controller 110 (e.g., the federation service 115) may make further determinations as to whether to replicate the data asset associated with the first customer at these data centers. Contrastingly, if the first customer and the second customer are onboarded at the same data centers, the collaboration controller 110 (e.g., the federation service 115) may determine to bypass the replication of the data asset.

At 406, the collaboration controller 110 may determine that the second customer is onboarded at a second data center but not the first data center. For example, in some cases, the collaboration controller 110 (e.g., the federation service 115) may determine that the second customer is onboarded at at least one data center, such as the second data center 130*b*, where the first customer is not onboarded at. Accordingly, as noted, the collaboration controller 110 (e.g., the federation service 115) may make further determinations as to whether to replicate the data asset associated with the first customer at these data centers.

At 408, the collaboration controller 110 may replicate, at the second data center, the data asset upon determining that a copy of the data asset is not already present at the second data center. In some example embodiments, upon determining that the second customer is onboarded at the second data center 130*b* and the first customer is not onboarded at the second data center 130*b*, the collaboration controller 110 (e.g., the federation service 115) may further determine whether the data asset associate with the first customer has already been replicated at the second data center 130*b* such that a copy of the data asset is already present at the second data center 130*b*. Accordingly, the collaboration controller 110 (e.g., the federation service 115) may replicate, at the second data center 130*b*, the data asset associated with the first customer if a copy of the data asset is not already present at the second data center 130*b*. Contrastingly, the collaboration controller 110 (e.g., the federation service 115) may bypass the replication of the data asset at the second data center 130*b* if a copy of the data asset is already present at the second data center 130*b*. In this latter scenario, the collaboration controller 110 (e.g., the federation service 115) may continue to check if a copy of the data asset is present at the other data centers, such as the third data center 130*c*, that the second customer but not the first customer is onboarded at.

At 410, the collaboration controller 110 may remove, from the second data center, the copy of the data asset based on one or more conditions. In some example embodiments, the collaboration controller 110 (e.g., the federation service 115) may impose, upon the replication and persistence of the data asset at the second data center 130*b*, one or more conditions which, in some cases, may be specified by the first customer associated with the data asset. For example, the first customer may specify a validity period and/or an expiration date for the copy of the data asset created at the second data center 130*b*, in which case the collaboration controller 110 (e.g., the federation service 115) may prevent the copy of the data asset from being persisted at the second data center 130*b* beyond validity period and/or the expiration date by at least deleting the copy of the data asset created at the second data center 130*b*. Alternatively and/or additionally, in some cases, the collaboration controller 110 (e.g., the federation service 115) may also delete the copy of the data asset created at the second data center 130*b* when the first customer unshares the data asset with the second customer or upon the offboarding of either the first customer or the second customer.

In some example embodiments, the collaboration controller 110 (e.g., the federation controller 115) may continue to update and synchronize the copy of the data asset created at the second data center 130*b* subsequent to the replication of the data asset. For example, in some cases, the collaboration controller 110 (e.g., the federation service 115) may automatically replicate the data center at the third data center 130*c* upon detecting an onboarding of the second customer at the third data center 130*c* after the data asset has already been replicated at the second data center 130*b*. Alternatively and/or additionally, the collaboration controller 110 (e.g., the federation service 115) may monitor for changes made to the data asset after the data asset has been replicated at the second data center 130*b*. For instance, in response to the first customer modifying the copy of the data asset at the first data center 130a, the collaboration controller 110 (e.g., the federation service 115) may propagate the same changes to the copy of the data asset at the second data center 130b.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a first collaboration request to share a data asset associated with a first customer onboarded at a first data center with a second customer; in response to the first collaboration request, determining that the second customer is onboarded at one or more different data centers than the first customer, the one or more different data centers including a second data center; determining whether a copy of the data asset is present at the second data center; and replicating, at the second data center, the data asset associated with the first customer upon determining that the copy of the data asset is not already present at the second data center, the replicating of the data asset providing the second customer access to the data asset by at least creating, at the second data center, the copy of the data asset.

Example 2: The system of Example 1, wherein the operations further comprise: in response to determining that the copy of the data asset is already present at the second data center, bypassing the replicating of the data asset at the second data center.

Example 3: The system of Example 2, wherein the operations further comprise: determining that the second customer is onboarded at a third data center but the first customer is not onboarded at the third data center; determining whether the copy of the data asset is present at a third data center; and replicating, at the third data center, the data asset associated with the first customer upon determining that the copy of the data asset is not already present at the third data center.

Example 4: The system of any of Examples 1 to 3, wherein the data asset comprises a profile of the first customer.

Example 5: The system of Example 4, wherein the replicating of the profile of the first customer at the second data center renders the first customer visible to the second customer onboarded at the second data center.

Example 6: The system of any of Examples 1 to 5, wherein the data asset includes one or more documents associated with an enterprise software application.

Example 7: The system of any of Examples 1 to 6, wherein the operations further comprise: deleting, from the second data center, the copy of the data asset upon an end of a validity period and/or an expiration of an expiration date specified by the first customer.

Example 8: The system of any of Examples 1 to 7, wherein the operations further comprise: deleting, from the second data center, the copy of the data asset in response to an offboarding of the first customer and/or the second customer.

Example 9: The system of any of Examples 1 to 8, wherein the operations further comprise: deleting, from the second data center, the copy of the data asset in response to a request from the first customer to unshare the data asset.

Example 10: The system of any of Examples 1 to 9, wherein the operations further comprise: detecting a modification of the data asset at the first data center; and in response to detecting the modification of the data asset at the first data center, propagating the modification to the second data center by at least applying a same change to the copy of the data asset at the second data center.

Example 11: The system of any of Examples 1 to 11, wherein the operations further comprise: receiving a second collaboration request from the second customer to access the data asset associated with the first customer; and replicating, at the second data center, the data asset associated with the first customer upon receiving, from the first customer, an approval of the request to access the data asset.

Example 12: A computer-implemented method, comprising: receiving a first collaboration request to share a data asset associated with a first customer onboarded at a first data center with a second customer; in response to the first collaboration request, determining that the second customer is onboarded at one or more different data centers than the first customer, the one or more different data centers including a second data center; determining whether a copy of the data asset is present at the second data center; and replicating, at the second data center, the data asset associated with the first customer upon determining that the copy of the data asset is not already present at the second data center, the replicating of the data asset providing the second customer access to the data asset by at least creating, at the second data center, the copy of the data asset.

Example 13: The method of Example 12, further comprising: in response to determining that the copy of the data asset is already present at the second data center, bypassing the replicating of the data asset at the second data center.

Example 14: The method of Example 13, further comprising: determining that the second customer is onboarded at a third data center but the first customer is not onboarded at the third data center; determining whether the copy of the data asset is present at a third data center; and replicating, at the third data center, the data asset associated with the first customer upon determining that the copy of the data asset is not already present at the third data center.

Example 15: The method of any of Examples 12 to 14, wherein the data asset comprises a profile of the first customer, and wherein the replicating of the profile of the first customer at the second data center renders the first customer visible to the second customer onboarded at the second data center.

Example 16: The method of any of Examples 12 to 15, wherein the data asset includes one or more documents associated with an enterprise software application.

Example 17: The method of any of Examples 12 to 16, further comprising: deleting, from the second data center, the copy of the data asset in response to at least one of (i) an end of a validity period and/or an expiration of an expiration date specified by the first customer, (ii) an offboarding of the first customer and/or the second customer, and (iii) a request from the first customer to unshare the data asset.

Example 18: The method of any of Examples 12 to 17, further comprising: detecting a modification of the data asset at the first data center; and in response to detecting the modification of the data asset at the first data center, propagating the modification to the second data center by at least applying a same change to the copy of the data asset at the second data center.

Example 19: The method of any of Examples 12 to 18, further comprising: receiving a second collaboration request from the second customer to access the data asset associated with the first customer; and replicating, at the second data center, the data asset associated with the first customer upon receiving, from the first customer, an approval of the request to access the data asset.

Example 20: A non-transitory computer readable medium storing instructions, which when executed by at least one data processor, result in operations comprising: receiving a first collaboration request to share a data asset associated with a first customer onboarded at a first data center with a second customer; in response to the first collaboration request, determining that the second customer is onboarded at one or more different data centers than the first customer, the one or more different data centers including a second data center; determining whether a copy of the data asset is present at the second data center; and replicating, at the second data center, the data asset associated with the first customer upon determining that the copy of the data asset is not already present at the second data center, the replicating of the data asset providing the second customer access to the data asset by at least creating, at the second data center, the copy of the data asset.

Figure 5:
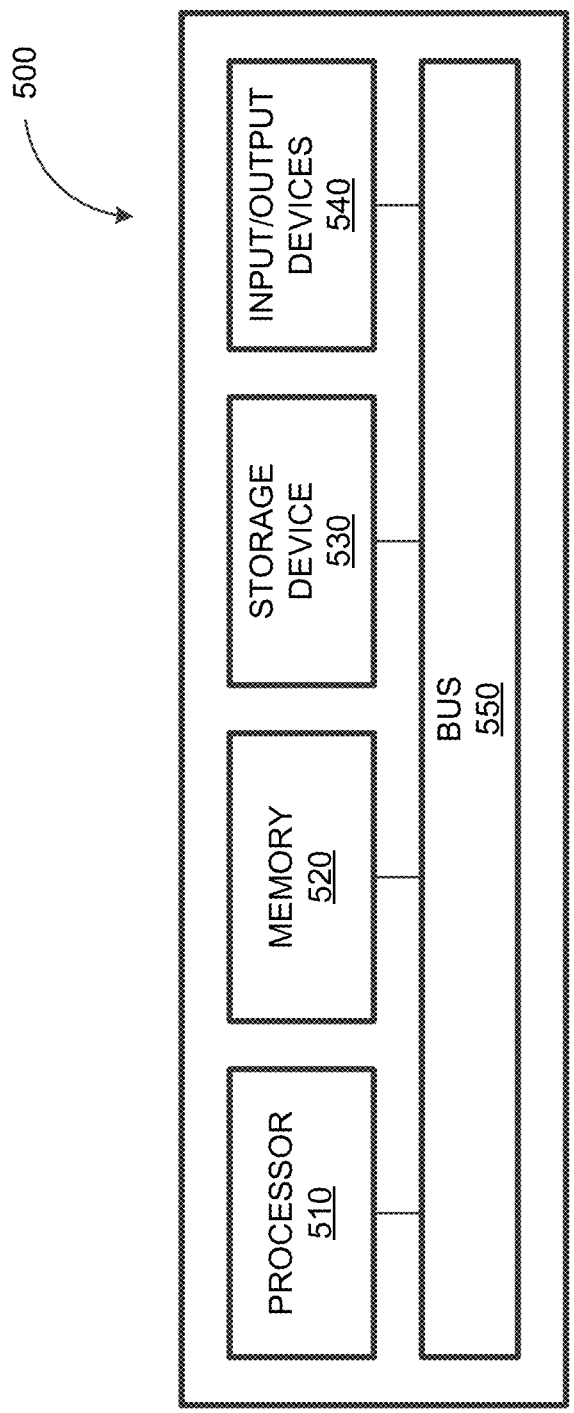
FIG. 5 depicts a block diagram illustrating an example of a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1-5, the computing system 500 can be used to implement the collaboration controller 110 and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the collaboration controller 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
   receiving a first collaboration request to share a data asset associated with a first customer onboarded at a first data center with a second customer, wherein the data asset comprises a profile of the first customer;
   in response to the first collaboration request, determining that the second customer is onboarded at one or more different data centers than the first customer, the one or more different data centers including a second data center;
   determining whether a copy of the profile of the first customer is present at the second data center;
   replicating, at the second data center, the profile of the first customer upon determining that the copy of the profile of the first customer is not already present at the second data center, wherein the replicating of the profile of the first customer at the second data center renders the first customer visible to the second customer onboarded at the second data center; and
   providing, to the second customer, access to the profile of the first customer by at least creating, at the second data center, the copy of the profile of the first customer.

2. The system of claim 1, wherein the operations further comprise:
   in response to determining that the copy of the profile of the first customer is already present at the second data center, bypassing the replicating of the profile of the first customer at the second data center.

3. The system of claim 2, wherein the operations further comprise:
   determining that the second customer is onboarded at a third data center but the first customer is not onboarded at the third data center;
   determining whether the copy of the profile of the first customer is present at a third data center; and
   replicating, at the third data center, the profile of the first customer upon determining that the copy of the profile of the first customer is not already present at the third data center.

4. The system of claim 1, wherein the data asset includes one or more documents associated with an enterprise software application.

5. The system of claim 1, wherein the operations further comprise:
   deleting, from the second data center, the copy of the profile of the first customer upon an end of a validity period and/or an expiration of an expiration date specified by the first customer.

6. The system of claim 1, wherein the operations further comprise:
   deleting, from the second data center, the copy of the profile of the first customer in response to an offboarding of the first customer and/or the second customer.

7. The system of claim 1, wherein the operations further comprise:
   deleting, from the second data center, the copy of the profile of the first customer in response to a request from the first customer to unshare the profile of the first customer.

8. The system of claim 1, wherein the operations further comprise:
   detecting a modification of the profile of the first customer at the first data center; and
   in response to detecting the modification of the profile of the first customer at the first data center, propagating the modification to the second data center by at least applying a same change to the copy of the profile of the first customer at the second data center.

9. The system of claim 1, wherein the operations further comprise:
   receiving a second collaboration request from the second customer to access the profile of the first customer; and
   replicating, at the second data center, the profile of the first customer upon receiving, from the first customer, an approval of the request to access the profile of the first customer.

10. A computer-implemented method, comprising:
    receiving a first collaboration request to share a data asset associated with a first customer onboarded at a first data center with a second customer, wherein the data asset comprises a profile of the first customer;

in response to the first collaboration request, determining that the second customer is onboarded at one or more different data centers than the first customer, the one or more different data centers including a second data center;

determining whether a copy of the profile of the first customer is present at the second data center;

replicating, at the second data center, the profile of the first customer upon determining that the copy of the profile of the first customer is not already present at the second data center, wherein the replicating of the profile of the first customer at the second data center renders the first customer visible to the second customer onboarded at the second data center; and providing, to the second customer, access to the profile of the first customer at least creating, at the second data center, the copy of the profile of the first customer.

11. The method of claim 10, further comprising:
in response to determining that the copy of the profile of the first customer is already present at the second data center, bypassing the replicating of the profile of the first customer at the second data center.

12. The method of claim 11, further comprising:
determining that the second customer is onboarded at a third data center but the first customer is not onboarded at the third data center;

determining whether the copy of the profile of the first customer is present at a third data center; and replicating, at the third data center, the profile of the first customer upon determining that the copy of the profile of the first customer is not already present at the third data center.

13. The method of claim 10, wherein the data asset includes one or more documents associated with an enterprise software application.

14. The method of claim 10, further comprising:
deleting, from the second data center, the copy of the profile of the first customer in response to at least one of (i) an end of a validity period and/or an expiration of an expiration date specified by the first customer, (ii) an offboarding of the first customer and/or the second customer, and (iii) a request from the first customer to unshare the data asset.

15. The method of claim 10, further comprising:
detecting a modification of the profile of the first customer at the first data center; and in response to detecting the modification of the profile of the first customer at the first data center, propagating the modification to the second data center by at least applying a same change to the copy of the profile of the first customer at the second data center.

16. The method of claim 10, further comprising:
receiving a second collaboration request from the second customer to access the profile of the first customer; and replicating, at the second data center, the profile of the first customer upon receiving, from the first customer, an approval of the request to access the profile of the first customer.

17. A non-transitory computer readable medium storing instructions, which when executed by at least one data processor, result in operations comprising:

receiving a first collaboration request to share a data asset associated with a first customer onboarded at a first data center with a second customer, wherein the data asset comprises a profile of the first customer;

in response to the first collaboration request, determining that the second customer is onboarded at one or more different data centers than the first customer, the one or more different data centers including a second data center;

determining whether a copy of the profile of the first customer is present at the second data center;

replicating, at the second data center, the profile of the first customer upon determining that the copy of the profile of the first customer is not already present at the second data center, the replicating of the profile of the first customer at the second data center renders the first customer visible to the second customer onboarded at the second data center; and providing, to the second customer, access to the profile of the first customer by at least creating, at the second data center, the copy of the profile of the first customer.

* * * * *